United States Patent Office

2,802,806
Patented Aug. 13, 1957

2,802,806

RUBBER TREATMENT

Kenneth W. Doak, Bloomfield, N. J., assignor to United States Rubber Company, New York, N. Y., a corporation of New Jersey No Drawing. Application November 18, 1953,
Serial No. 392,987

7 Claims. (Cl. 260—41.5)

This invention relates to improvements in the technique of processing high carbon black and rubber mixes prior to vulcanization thereof, and more particularly to improvements in so-called "low-hysteresis" processing of carbon black and rubber mixes.

The technique of processing high carbon black and rubber mixes prior to vulcanization thereof, whereby to obtain vulcanizates with improvements in physical and chemical properties, is described in Gerke et al. U. S. P. 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

These improved vulcanizates are obtained, in accordance with the Gerke et al. technique, by incorporating in the rubber a relatively large amount of carbon black, for example, at least 25 parts, and preferably in the case of tire treads at least 40 parts by weight of carbon black per 100 parts by weight of rubber, and then subjecting a substantially homogeneous mixture of the ingredients to a heat treatment at a temperature subsantially above 250° F., the preferred temperature being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration will be found suitable for most purposes, and particularly within the preferred temperature range.

An object of the present invention is to provide a new chemical promoter for the processing of rubber and carbon black mixes as described in U. S. P. 2,118,601 whereby to obtain high electrical resistance and low torsional hysteresis of tread stocks. A further object is to provide substantial decreases in the time of the low-hysteresis processing by the use of the herein disclosed chemical with consequent increase in the capacity and output of equipment. Other objects will appear more fully hereinafter.

I have found that hexachloropropene substantially decreases the time and/or lowers the temperature required for low-hysteresis processing of mixtures of rubber and carbon black. It is effective in natural rubber (i. e., Hevea rubber), synthetic rubbery homopolymers of aliphatic conjugated diolefin hydrocarbons, especially butadiene and isoprene, and synthetic rubbery copolymers of such diolefin hydrocarbons with copolymerizable monoolefinic compounds, such as isobutylene, styrene, alpha-methyl styrene, methyl acrylate, ethyl acrylate, methyl methacrylate, acrylonitrile, methyl vinyl ketone, methyl isopropenyl ketone, and monovinylpyridines. It is particularly effective in natural rubber, in rubbery copolymers of a major proportion, typically from 90 to 99.5%, of isobutylene and a minor proportion, typically correspondingly from 10 to 0.5%, of an aliphatic conjugated diolefin hydrocarbon, especially butadiene or isoprene (known commercially as "Butyl rubber"), and in rubbery copolymers of butadiene and styrene (known as "GR-S"). It is effective also in compatible mixtures of the aforementioned rubbery materials, for example, in blends of natural rubber with rubbery copolymers of butadiene and styrene.

The process of my invention comprises mixing the rubber with a relatively large amount of a rubber-reinforcing carbon black and a relatively small but effective amount, viz., from 0.5 to 3 parts per 100 parts of rubbery material, of hexachloropropene, and heating this mixture at a temperature of from 275° F. to a temperature just short of that at which the rubber would be injured, e. g., heating it at 275–400° F., to bring about the desired changes in the rubber and carbon black mixture whereby a vulcanizate of this mixture will have a considerably reduced torsional hysteresis and a considerably increased electrical resistivity. This heat treatment is carried out in the absence of vulcanizing materials, e. g., sulfur or sulfur-yielding compounds. Following the heat treatment, the vulcanizing and other desired compounding ingredients including conventional accelerators, if necessary or desired, and the like are intimately incorporated in the conventional manner, after which the mixture is shaped and vulcanized in the usual way.

If desired, softeners, e. g., hydrocarbons commonly used as rubber softeners, and/or fatty acid, especially stearic acid, can be present during the heat treatment. If stearic acid is present in sufficient amount, its later addition is unnecessary.

Any carbon black which is capable of reinforcing the rubber can be used in the practice of my invention. I usually use either a furnace black or a channel black. Those skilled in the art will appreciate that the type of black is often selected with reference to the particular rubber employed. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can be as great as 100 parts per 100 parts of rubber.

In the preferred practice of my invention, the heat treatment of the mixture of rubber, carbon black and the promoter, hexachloropropene, is carried out by mastication of temperatures in the range 275–400° F., and more preferably in the range 300–400° F., with any suitable type of masticating equipment such as an open two-roll rubber mill or, more preferably, an internal rubber mixer, especially a Banbury mixer. The Banbury mixer is particularly advantageous because it exerts a severe masticatory action upon the charge and because it conserves the heat generated by the mixing action and this heat greatly aids in elevation of the stock temperature to within the desired range. Depending upon the size and operating speed of the Banbury mixer, and other factors, extraneous heat may or may not need to be applied to bring the stock temperature within the desired temperature range and to hold it there. If desired, extraneous cooling may be applied to keep the temperature from rising above the desired level.

The optimum duration of the heat treatment will vary depending upon many factors, including the temperature of heat treatment, type of heat treatment, i. e., whether it is static or dynamic, type of equipment used, e. g., in the case of masticatory heat treatment whether an open rubber mill or a Banbury or other type of internal mixer is used, amount of hexachloropropene promoter used, etc. In any event, the treating time will be considerably shorter, at given temperature conditions, than the time required when the hexachloropropene promoter is omitted. In the case of the preferred masticatory treatment, times of the order of 5 to 30 minutes will generally be adequate for the purposes of my invention, the longer times being used at the lower temperatures and vice versa. It is well known that different rubbers vary as to the highest temperatures they can withstand without harm and the time and temperature should of course be so regulated as to not impair the properties of the final vulcanizate.

When my invention is applied to "Butyl rubber," the heat treatment is usually performed at a higher temperature and for a longer time than is the case with natural rubber or "GR-S" in order to bring about the same reduction in torsional hysteresis and increase in electrical resistivity. With Butyl rubber a temperature of at least 325° F. is preferred.

It is preferable to form an intimate mixture of the rubber, carbon black and hexachloropropene at a relatively low temperature, i. e., below 275° F., in order to avoid premature reaction of the hexachloropropene whereby its promoting effect upon the low-hysteresis processing would be reduced.

The following examples illustrate the preferred methods of practicing the invention. All parts are by weight.

EXAMPLE 1

A masterbatch is prepared by mixing together 100 parts of Hevea rubber, 50 parts of carbon black (a medium processing channel black known commercially as "Spheron #6") and 5 parts of stearic acid. This mixing operation is carried out in a conventional manner in a Banbury mixer or on a two-roll rubber mill. To a portion of this masterbatch is added 2.5 parts of hexachloropropene, at a temperature below 275° F. The mill temperature is then raised to 300° F. and the mixture is masticated for 10 minutes. Thereafter the mill is cooled to 150–225° F. and 2 parts of pine tar, 2 parts of zinc oxide, 1 part of antioxidant, 1 part of accelerator, and 2.6 parts of sulfur are incorporated. The mixture is placed in a suitable mold and vulcanized 45 minutes at 287° F. As a control, an identical portion of the masterbatch is subjected to the same manipulative steps except that the hexachloropropene is omitted. The specific electrical resistivity and torsional hysteresis are determined for the vulcanizates.

The results are recorded below:

|  | Log Resistivity | Torsional Hysteresis, 280° F. |
| --- | --- | --- |
| Control | 8.5 | 0.107 |
| With Hexachloropropene | >13.0 | 0.062 |

The practice of the invention has thus reduced the torsional hysteresis by over 40% and has increased the specific electrical resistivity by a factor of over 30,000. In the absence of the chemical promoter, mastication for over 30 minutes at 300° F. would be required to obtain this result.

EXAMPLE 2

A masterbatch is prepared by mixing in a conventional manner 100 parts of an isobutylene-isoprene copolymer (known commercially as "Butyl-15") and 50 parts of channel black ("Spheron #6"). Various amounts of hexachloropropene are added to portions of this masterbatch, at a temperature below 275° F. The mixtures are then masticated at various high temperatures, in a Banbury mixer. Thereafter, 5 parts of zinc oxide, 3 parts of stearic acid, 1 part of tetramethylthiuram disulfide, 0.5 part of 2-mercaptobenzothiazole, and 2 parts of sulfur (per 100 of rubber) are incorporated on a two-roll mill at 150–200° F. The stocks are vulcanized in molds at 293° F. Control stocks are subjected to the same manipulative steps, except that no hexachloropropene is added. The data are summarized in the following table.

*Hexachloropropene in mixture of "Butyl–15" and MPC black*

| Parts hexa-chloro-propene | Hot Milling | | ML-4 (212° F.) | Log Resis-tivity | Tors. Hyst. (280° F.) | Stress 300% | Cure Time |
| --- | --- | --- | --- | --- | --- | --- | --- |
| | Time (mins.) | Temp. (° F.) | | | | | |
| ------ | 15 | 375 | 66 | 6.9 | 0.156 | 1,175 | 60' |
| 1.5 | 15 | 375 | 47 | >13.0 | 0.070 | 1,250 | 60' |
| ------ | 20 | 375 | 61 | 6.8 | 0.170 | 1,200 | 60' |
| 0.75 | 20 | 375 | 52 | >13.0 | 0.069 | 1,300 | 60' |
| 1.5 | 20 | 375 | 38 | >13.0 | 0.053 | 1,215 | 60' |
| 1.5 | 20 | 325 | 53 | 7.7 | 0.144 | 1,000 | 90' |
| ------ | 15 | 340 | 78 | 5.6 | 0.225 | ---- | ---- |

The results show that the practice of the invention in some cases has reduced the torsional hysteresis by over 50% and has increased the specific electrical resistivity by a factor of over 1,000,000, and that Butyl rubber requires a temperature higher than 325° F. for most effective "LH" processing.

EXAMPLE 3

A masterbatch is prepared by mixing together 70 parts of Hevea rubber, 30 parts of a butadiene-styrene copolymer (GR–S polymerized in emulsion at 41° F.), 55 parts of channel black ("Spheron #6"), 6 parts of a hydrocarbon softener ("Paraflux") and one part of stearic acid. This mixing operation is carried out in a conventional manner in a Banbury mixer or on a two-roll rubber mill. To this masterbatch is added 1.5 parts of hexachloropropene at a temperature below 275° F. The mixture is masticated for 8 minutes at 325° F. Thereafter, vulcanizing ingredients (3 parts of zinc oxide, 0.65 part of 2-mercaptobenzothiazole, 0.25 part of diphenylguanidine, and 2 parts of sulfur) are incorporated at 225° F. and the stock is vulcanized for 45 minutes at 293° F. As a control, an identical portion of the masterbatch is subjected to the previously described manipulative steps, except that no hexachloropropene is added. The specific electrical resistivity and torsional hysteresis are determined for the vulcanizates.

|  | Log Resistivity | Torsional Hysteresis, 280° F. |
| --- | --- | --- |
| Control | 8.1 | 0.162 |
| With hexachloropropene | 11.3 | .118 |

The practice of the invention has reduced the torsional hysteresis by over 25%, and has increased the specific electrical resistivity by a factor of over 1000.

EXAMPLE 4

A masterbatch is prepared by mixing together 100 parts of a butadiene-styrene copolymer (GR–S polymerized at 41° F.), 52 parts of medium processing channel black, 6 parts of hydrocarbon softener ("Paraflux"), and one part of stearic acid. To this masterbatch is added 0.5 part of hexachloropropene at 225° F. The mixture is masticated for 10 minutes at 325° F. in a Banbury mixer. Thereafter, vulcanizing ingredients as in Example 3 are incorporated at 225° F. The stock is vulcanized for 30 minutes at 293° F. As a control, an identical portion of the masterbatch is subjected to the previously described manipulative steps, except that no hexachloropropene is added. The specific electrical resistivity and torsional hysteresis are measured.

|  | Log Resistivity | Torsional Hysteresis, 280° F. |
|---|---|---|
| Control | 8.0 | 0.134 |
| With hexachloropropene | 10.2 | .097 |

The practice of the invention has reduced the torsional hysteresis by over 25% and has increased the specific electrical resistivity by a factor of over 100.

EXAMPLE 5

100 parts of a copolymer of approximately 80% butadiene and approximately 20% acrylonitrile (known commercially as "Paracril 18–80"), 50 parts of medium processing channel black, 6 parts of hydrocarbon softener, and 1 part of stearic acid are mixed in a conventional manner. To this mixture is added 1.25 parts of hexachloropropene, at a temperature not higher than 275° F. The mixture is masticated 8 minutes in a Banbury mixer at 325° F. Then 5 parts of zinc oxide, 1 part of 2-mercaptobenzothiazyl disulfide, and 1.5 parts of sulfur are incorporated in a conventional manner. The stock is vulcanized 25 minutes at 293° F. A control is prepared in an identical manner, except that no hexachloropropene is used, and the stock is vulcanized 60 minutes at 325° F. The following results are obtained:

|  | Log Resistivity | Torsional Hysteresis, 280° F. |
|---|---|---|
| Control | 7.9 | 0.164 |
| Sample with hexachloropropene | 8.8 | .108 |

The practice of the invention has increased the specific electrical resistivity and reduced the torsional hysteresis.

Although I have disclosed my invention with particular emphasis upon the preferred practice wherein the heat treatment is accompanied with mastication, nevertheless my invention can be practiced by carrying out the heat treatment under static conditions. For example, I may intimately mix the rubber, carbon black and hexachloropropene in any suitable manner and then heat this mixture at 275–400° F. without simultaneously masticating it, the heat-treated mixture being subsequently masticated and compounded with conventional compounding and vulcanizing ingredients followed by shaping and vulcanizing in the usual way. The static heat-treatment can be conducted by placing slabs of the stock in an oven heated to a suitable temperature, or slabs of hot stock can be stacked up and allowed to stand for several hours, preferably under relatively non-heat-conductive conditions, in order to maintain the mixture at the temperature of 275–400° F. for as long as reasonably possible. If desired, the slabs can be wrapped with a suitable insulating blanket to cause prolonged retention of heat. Such static heat-treatment has the advantage of releasing the Banbury equipment from use for carrying out the heat-treatment and this may be desirable under certain conditions.

The electrical resistivity values given in the above examples were determined by measuring the resistance of a specimen of known thickness (about 0.1 inch) placed between mercury electrodes, under a potential difference of 135 volts, using a sensitive galvanometer with an Ayrton shunt. The logarithm (to base 10) of the specific electrical resistivity (expressed in ohm-cms.) is designated "Log Resistivity."

The torsional hysteresis figures represent the logarithmic decrement (to base 10) of the observed amplitudes of successive oscillations of a torsion pendulum, measured at 280° F. with an apparatus consisting essentially of a torsion pendulum in which the sample of rubber tested supplies the restoring force when the pendulum is deflected. For further description of this test see Gerke et al. 2,118,601.

Having thus described my invention, what I claim and desire to protect by Letters Patent is:

1. A process which comprises mixing rubber selected from the group consisting of natural rubber, synthetic rubbery homopolymers of aliphatic conjugated diolefin hydrocarbons selected from the group consisting of butadiene and isoprene, and synthetic rubbery copolymers of the said aliphatic conjugated diolefin hydrocarbons with a copolymerizable monoolefinic compound selected from the group consisting of isobutylene, styrene, alpha-methyl styrene, methyl acrylate, ethyl acrylate, methyl methacrylate, acrylonitrile, methyl vinyl ketone, methyl isopropenyl ketone and monovinylpyridines with a relatively large amount of rubber-reinforcing carbon black, and hexachloropropene in amount equal to from 0.5 to 3 parts per 100 parts of said rubber, heating the mixture at a temperature of at least 275° F. but below that at which the rubber would be harmed, thereafter incorporating vulcanizing and other desired ingredients, shaping the mass, and vulcanizing the resulting shaped mass.

2. A process which comprises mixing rubber selected from the group consisting of natural rubber, synthetic rubbery homopolymers of aliphatic conjugated diolefin hydrocarbons selected from the group consisting of butadiene and isoprene, and synthetic rubbery copolymers of the said aliphatic conjugated diolefin hydrocarbons with a copolymerizable monoolefinic compound selected from the group consisting of isobutylene, styrene, alpha-methyl styrene, methyl acrylate, ethyl acrylate, methyl methacrylate, acrylonitrile, methyl vinyl ketone, methyl isopropenyl ketone and monovinylpyridines with a relatively large amount of rubber-reinforcing carbon black, and hexachloropropene in amount equal to from 0.5 to 3 parts per 100 parts of said rubber, masticating the mixture at a temperature of from 275° to 400° F., thereafter incorporating vulcanizing and other desired ingredients, shaping the mass, and vulcanizing the resulting shaped mass.

3. A process which comprises mixing natural rubber with a relatively large amount of rubber-reinforcing carbon black, and hexachloropropene in amount equal to from 0.5 to 3 parts per 100 parts of said rubber, masticating the mixture at a temperature of from 275° to 400° F., thereafter incorporating vulcanizing and other desired ingredients, shaping the mass, and vulcanizing the resulting shaped mass.

4. A process which comprises mixing a rubbery copolymer of butadiene and styrene with a relatively large amount of rubber-reinforcing carbon black, and hexachloropropene in amount equal to from 0.5 to 3 parts per 100 parts of said copolymer, masticating the mixture at a temperature of from 275° to 400° F., thereafter incorporating vulcanizing and other desired ingredients, shaping the mass, and vulcanizing the resulting shaped mass.

5. A process which comprises mixing rubber comprising a mixture of natural rubber and a rubbery butadiene-styrene copolymer with a relatively large amount of rubber-reinforcing carbon black, and hexachloropropene in amount equal to from 0.5 to 3 parts per 100 parts of said rubber, masticating the mixture at a temperature of from 275° to 400° F., thereafter incorporating vulcanizing and other desired ingredients, shaping the mass, and vulcanizing the resulting shaped mass.

6. A process which comprises mixing a rubbery copolymer of isobutylene and an aliphatic conjugated diolefin with a relatively large amount of rubber-reinforcing carbon black, and hexachloropropene in amount equal to from 0.5 to 3 parts per 100 parts of said copolymer, masticating the mixture at a temperature of from 325° to 400° F., thereafter incorporating vulcanizing and other desired ingredients, shaping the mass, and vulcanizing the resulting shaped mass.

7. A process which comprises mixing a rubbery copolymer of butadiene and acrylonitrile with a relatively large amount of rubber-reinforcing carbon black, and hexachloropropene in amount equal to from 0.5 to 3 parts per 100 parts of said copolymer, masticating the mixture at a temperature of from 275° to 400° F., thereafter incorporating vulcanizing and other desired ingredients, shaping the mass, and vulcanizing the resulting shaped mass.

References Cited in the file of this patent

UNITED STATES PATENTS 2,118,601     Gerke et al. _____ May 24, 1938